United States Patent
Nguyen et al.

(10) Patent No.: US 11,236,791 B2
(45) Date of Patent: Feb. 1, 2022

(54) MULTI-AXIAL ENERGY DAMPING AND DISPLACEMENT CONTROL

(71) Applicant: Raytheon Company, Waltham, MA (US)

(72) Inventors: Ly Dinh Nguyen, Cypress, TX (US); Stevie Alejandro, Sahuarita, AZ (US)

(73) Assignee: Raytheon Company, Waltham, MA (US)

( * ) Notice: Subject to any disclaimer, the term of this patent is extended or adjusted under 35 U.S.C. 154(b) by 80 days.

(21) Appl. No.: 16/657,859

(22) Filed: Oct. 18, 2019

(65) Prior Publication Data

US 2021/0115992 A1    Apr. 22, 2021

(51) Int. Cl.
  *F16F 1/06* (2006.01)
  *F16F 1/374* (2006.01)
  *F16F 15/08* (2006.01)

(52) U.S. Cl.
  CPC .......... *F16F 1/065* (2013.01); *F16F 1/374* (2013.01); *F16F 15/085* (2013.01); *F16F 2230/007* (2013.01)

(58) Field of Classification Search
  CPC .......... F16F 1/374; F16F 1/376; F16F 1/3828; F16F 1/065; F16F 15/085; F16F 2230/007; F16F 3/0873; F16F 3/087
  USPC ........ 267/139, 140, 145, 152, 153; 248/615, 248/616, 570
  See application file for complete search history.

(56) References Cited

U.S. PATENT DOCUMENTS

| 2,460,829 | A | * | 2/1949 | Ivanovie | F16F 1/374 |
| | | | | | 267/140.2 |
| 2,697,578 | A | * | 12/1954 | Whittam | F16F 3/0873 |
| | | | | | 267/140.3 |
| 3,008,703 | A | * | 11/1961 | Slemmons | F16F 9/0427 |
| | | | | | 267/118 |
| 3,204,913 | A | * | 9/1965 | Lawrence | F16F 7/14 |
| | | | | | 248/570 |

(Continued)

FOREIGN PATENT DOCUMENTS

| CN | 2890488 Y | 4/2007 | |
| DE | 19715255 A1 * | 10/1998 | ............... F16F 1/44 |

(Continued)

OTHER PUBLICATIONS

International Search Report for International Application No. PCT/US2020/046848 dated Nov. 6, 2020, 12 pages.

*Primary Examiner* — Thomas J Williams (57) ABSTRACT

An energy damping and displacement control device is disclosed. The energy damping and displacement control device can include a contact protrusion and an energy damping pad constructed of a resilient material. The energy damping pad can have a first face oriented along a first plane. The energy damping pad can also have a second face oriented along a second plane transverse to the first plane, and toward the contact protrusion. In a static condition, the first and second faces of the energy damping pad can be separated from the contact protrusion. In a dynamic condition, displacement motion of the contact protrusion relative to the energy damping pad can be limited by contact with at least one of the first or second faces of the energy damping pad, which provides energy damping and motion displacement control of the contact protrusion in multiple axes.

26 Claims, 5 Drawing Sheets

(56) References Cited

U.S. PATENT DOCUMENTS

| | | | |
|---|---|---|---|
| 3,585,958 A | | 6/1971 | Naczkowski |
| 3,625,466 A | * | 12/1971 | Marshall ................ F16F 15/02 |
| | | | 248/626 |
| 4,076,195 A | * | 2/1978 | Uhler .................. B60K 5/1283 |
| | | | 248/274.1 |
| 5,036,784 A | | 8/1991 | Wagner |
| 5,305,496 A | | 4/1994 | Gagnon et al. |
| 5,549,285 A | | 8/1996 | Collins |
| 5,782,461 A | | 7/1998 | Gwinn |
| 6,585,241 B1 | | 7/2003 | Hartl et al. |
| 7,325,792 B2 | | 2/2008 | Siino et al. |
| 7,510,147 B2 | * | 3/2009 | Haber ..................... B64D 1/02 |
| | | | 244/137.1 |
| 7,793,922 B2 | * | 9/2010 | Hikosaka ............... B60G 11/54 |
| | | | 267/33 |
| 8,276,894 B2 | * | 10/2012 | Dickson .................... F16F 1/44 |
| | | | 267/233 |
| 8,616,538 B2 | | 12/2013 | Al-Dahhan et al. |
| 2006/0255517 A1 | * | 11/2006 | Lee ....................... F16F 13/005 |
| | | | 267/148 |
| 2021/0115992 A1 | * | 4/2021 | Nguyen .................... F16F 7/14 |

FOREIGN PATENT DOCUMENTS

| | | | | |
|---|---|---|---|---|
| FR | 2189660 A1 | | 1/1974 | |
| GB | 665079 A | | 1/1952 | |
| GB | 914166 A | | 12/1962 | |
| GB | 1550922 A | * | 8/1979 | ............... F16F 1/40 |
| JP | 5797024 B2 | | 5/2014 | |
| KR | 10-1362926 | | 2/2014 | |
| RU | 169088 U1 | | 3/2017 | |
| WO | WO 2005/053572 A2 | | 6/2005 | |
| WO | WO 2009/070884 A1 | | 6/2009 | |
| WO | WO 2013/057408 A1 | | 4/2013 | |

\* cited by examiner

MULTI-AXIAL ENERGY DAMPING AND DISPLACEMENT CONTROL

GOVERNMENT LICENSE RIGHTS

This invention was made with government support under contract N00024-15-C-5406, awarded by the United States of America Naval Sea Systems Command. The government has certain rights in the invention.

BACKGROUND

Many mechanical systems require energy absorption devices or motion displacement and isolators for dissipating the kinetic energy of a component element in the system. Such mechanical systems include, for example, shipping cases, skids and containers, shipboard electronics and navigational equipment, pumps, generators and compressors, chemical processing equipment, avionics, and various other such systems. Shock and vibration may be caused by a variety of sources, such as seismic events, wind storms, blast levels, vehicle operation, among others. Shock and vibration affect the performance of all types of mechanical and electrical equipment contained in these systems. If such shock and vibration are left uncontrolled, they can cause premature equipment failure and costly downtime.

One particular example is a shipboard, heavy enclosure with sensitive electrical and computer equipment, which may be used for weapon systems, navigation systems, etc. The enclosure may be mounted on a ship deck and subject to high shock load, wind and wave loads, environmental conditions, and ship motion in all directions. Motion isolators, such as typical wire rope coiled motion isolators, are typically used to isolate the enclosure from the ship's combined loading effects.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein.

Reference will now be made to the exemplary embodiments illustrated, and specific language will be used herein to describe the same. It will nevertheless be understood that no limitation of the scope of the invention is thereby intended.

DETAILED DESCRIPTION

An initial overview of the inventive concepts are provided below and then specific examples are described in further detail later. This initial summary is intended to aid readers in understanding the examples more quickly, but is not intended to identify key features or essential features of the examples, nor is it intended to limit the scope of the claimed subject matter.

A wide variety of energy absorption devices or motion isolators exist for use in applications where control or damping of shock and vibration are required. Often, however, motion isolators are not designed to control displacement or provide for displacement adjustment. In many cases, loading conditions overcome the motion isolators, which can cause damage to the motion isolators and/or to the equipment being supported. For example, "softer" isolator wire ropes are often used to minimize high g-force shock impact in a certain direction to protect sensitive electrical and computer equipment. Such an isolator may meet a shock absorption requirement in a given direction, but may not be rigid enough to prevent bottoming out under a rotational or combined loads, which may permanently distort the isolator coil and degrade its ability to function properly. In addition, bottoming out the suspension transfers large loads to the suspended item, which can cause damage to the item.

Although various snubbers and bumpers exist to minimize this risk, these devices are typically only effective to dissipate energy and limit motion in one direction or degree of freedom. Due to the complex nature of the combined loading effects many supported components are subjected to, this limited ability to constrain motion and dissipate energy provided by typical snubber and bumper devices leaves supported components and their motion isolators vulnerable in many applications.

Accordingly, an energy damping and displacement control device is disclosed that provides energy damping and motion displacement control in multiple degrees of freedom. In one aspect, motion can be restricted to within a safe range for a motion isolator while damping energy to maintain functional integrity of the motion isolator and protect a supported structure from damage. The energy damping and displacement control device can include a contact protrusion and an energy damping pad constructed of a resilient material. The energy damping pad can have a first face oriented along a first plane. The energy damping pad can also have a second face oriented along a second plane transverse to the first plane, and toward the contact protrusion. In a static condition, the first and second faces of the energy damping pad can be separated from the contact protrusion. In a dynamic condition, displacement motion of the contact protrusion relative to the energy damping pad can be limited by contact with at least one of the first or second faces of the energy damping pad, which provides energy damping and motion displacement control of the contact protrusion in multiple axes.

An energy damping and displacement control system is also disclosed. The energy damping and displacement control system can include a base, a supported structure, a motion isolator supporting the supported structure about the base, and an energy damping and displacement control device. The energy damping and displacement control device can include a contact protrusion associated with one of the base or the supported structure. The energy damping and displacement control device can also include an energy damping pad associated with the other of base or the supported structure. The damping pad can be constructed of a resilient material. The damping pad can have a first face oriented along a first plane. The damping pad can also have a second face oriented along a second plane transverse to the first plane, and toward the contact protrusion. In a static condition, the first and second faces of the energy damping pad can be separated from the contact protrusion. In a dynamic condition, displacement motion of the contact protrusion relative to the energy damping pad can be limited by contact with at least one of the first or second faces of the energy damping pad, which provides energy damping and motion displacement control of the contact protrusion in multiple axes.

Figure 1:
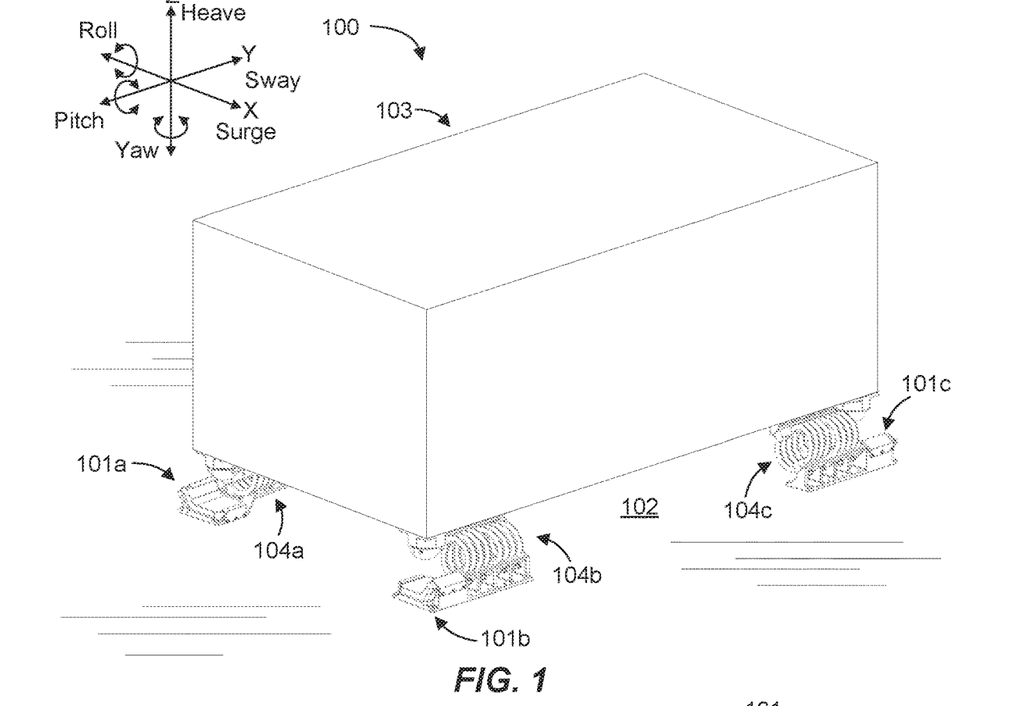
FIG. 1 is an illustration of an energy damping and displacement control system in accordance with an example of the present disclosure.

To further describe the present technology, examples are now provided with reference to the figures. With reference to FIG. 1, one embodiment of an energy damping and displacement control system 100 is illustrated, which includes one or more energy damping and displacement control devices 101a-c. The system 100 can also comprise a base 102, a supported structure or component (e.g., an enclosure) 103, and one or more motion isolators 104a-c supporting the supported structure 103 about the base 102.

The base 102 and the supported structure 103 can be of any suitable type or configuration. For example, the base 102 can be a ship (e.g., a deck of a ship), a skid, a train, a truck, a trailer, an aircraft, or any other movable structure or structure that may be subjected to displacement and/or force/moment loading inputs. The supported structure 103 can be an electronics enclosure (e.g., shipboard electronics and/or navigational equipment), a computer, a shipping case, a container (e.g., a shipping container), a pump, a generator, a compressor, a chiller assembly, chemical processing equipment, avionics, seat or any other item that may be supported by the base 102. Due to loading input from the base 102 and/or loading input acting directly on the supported structure 103, the supported structure 103 can be caused to move in six-degrees of freedom (e.g., surge, sway, heave, roll, pitch, and yaw), as illustrated in FIG. 1.

The motion isolators 104a-c can be of any suitable type or configuration. For example, one or more of the motion isolators 104a-c can include a spring (e.g., an elastic mechanical device such as a coil spring, torsional spring, a beam (e.g., cantilever or leaf) spring, and/or a gas spring such as a pneumatic or hydraulic spring or cylinder), a damping device (e.g., a shock absorber), and/or any other suitable suspension component. In one example, one or more of the motion isolators 104a-c can be or include a wire rope motion isolator, which can have any suitable configuration. The wire rope motion isolator can include a wire coil in a generally cylindrical configuration oriented horizontally. Individual coils can be secured or clamped in a fixed position relative to one another by coil supports (e.g., retainer blocks) on opposite sides of the coils. The coil supports can be secured to the coils by a series of fasteners along the coil supports. The coil supports allow the individual coils to be elastically deformable under relative movement between the coil supports to provide a spring-like quality for supporting the supported structure 103 about the base 102, as well as providing damping and dissipation of vibrational energy. Wire rope motion isolators can be configured to provide desired performance characteristics for a given application. For example, the size (e.g., thickness) of the wire can be varied depending on the load and required damping characteristics of a particular application. The number of coils can also be varied depending on the load and required damping characteristics for a particular application. In addition, the configuration of the coils (e.g., the angle of inclination of the coils, winding direction, etc.) can be selected to provide desired performance characteristics. One suitable wire rope isolator design is described in U.S. Pat. No. 5,549,285, which is incorporated by reference in its entirety herein.

Figure 2:
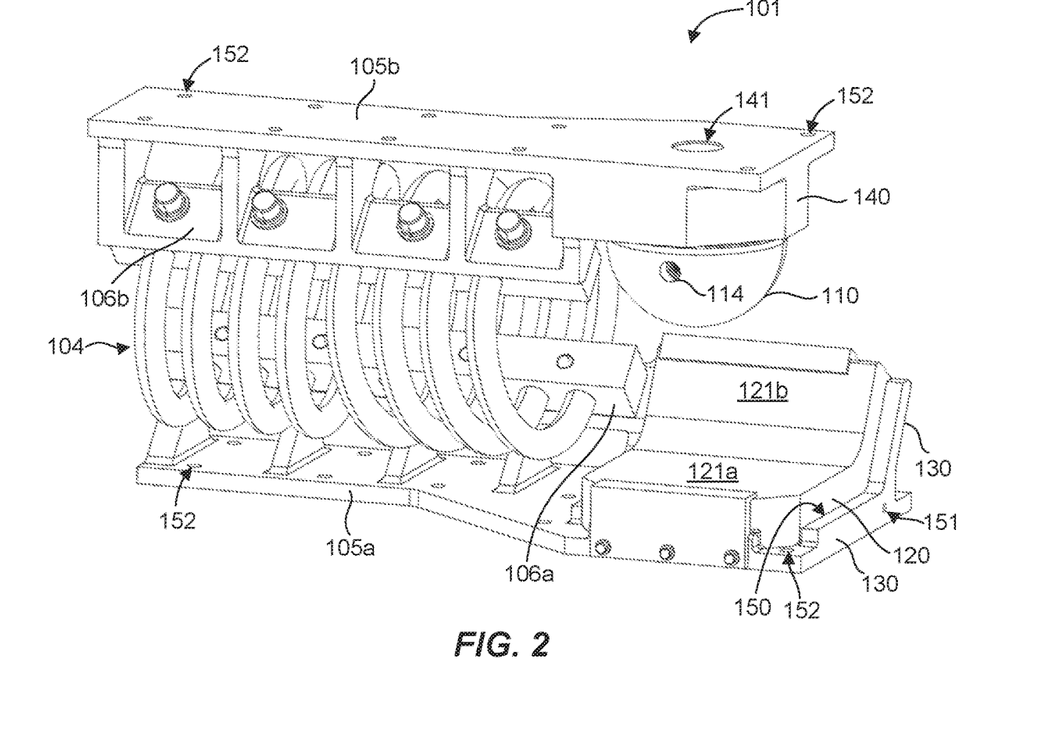
FIGS. 2 and 3 are perspective views of an energy damping and displacement control device in accordance with an example of the present disclosure.
Figure 3:
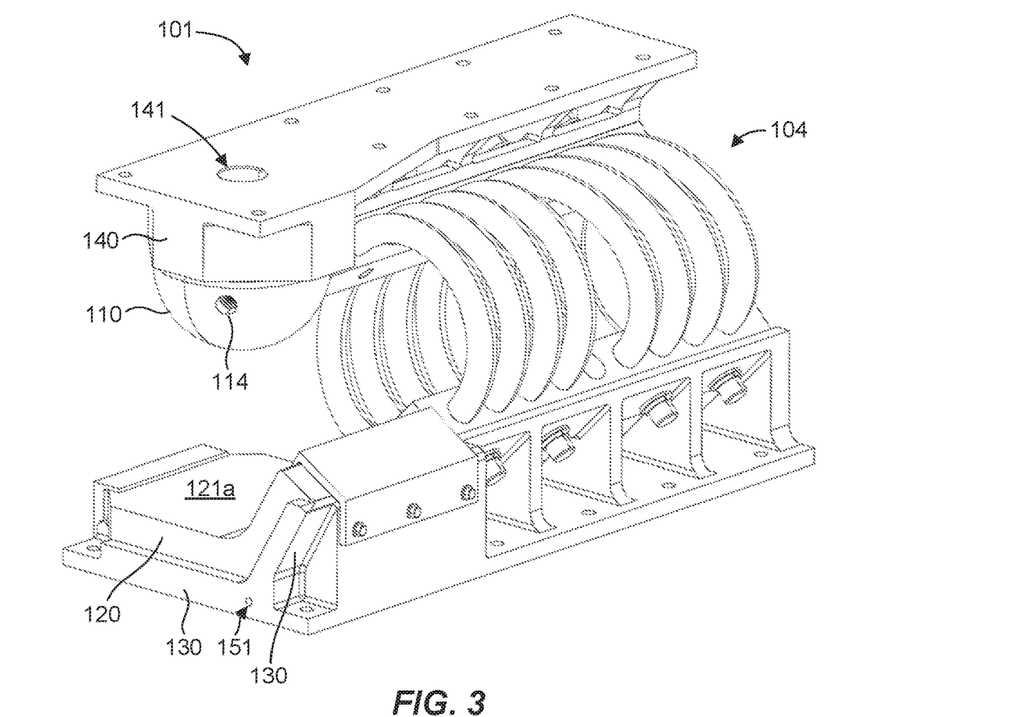
Figure 4:
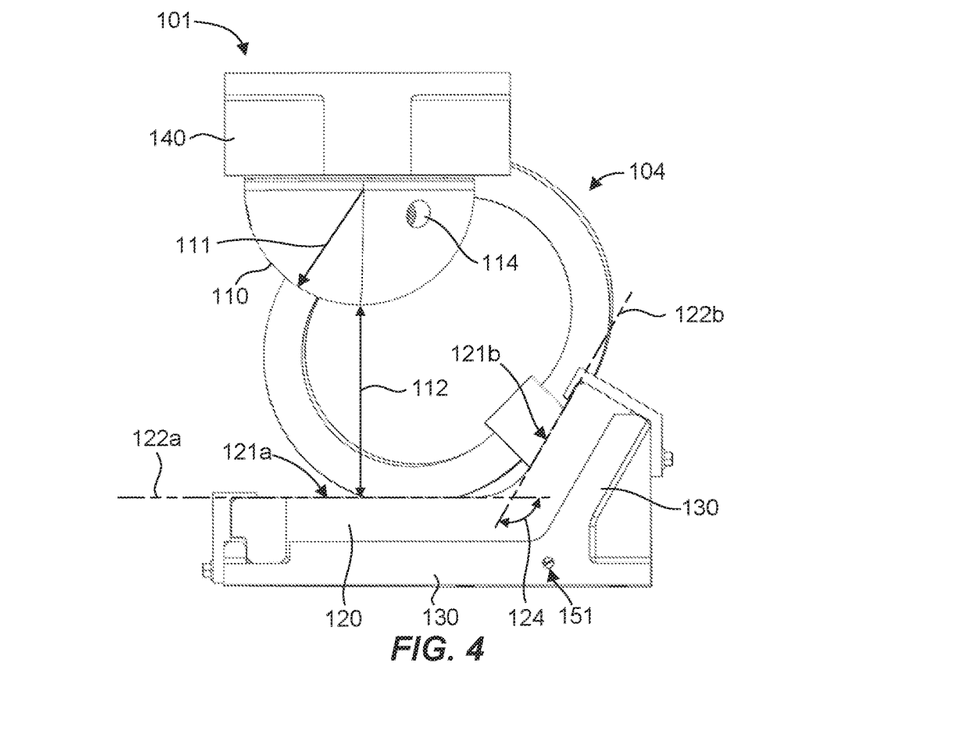
FIG. 4 is an end view of the energy damping and displacement control device of FIGS. 2 and 3.

An energy damping and displacement control device 101 is shown in FIGS. 2-4, which is representative of the energy damping and displacement control devices 101a-c of FIG. 1. In the example illustrated in FIGS. 2-4, the energy damping and displacement control device 101 includes a motion isolator 104, although in other examples the motion isolator 104 is a separate and distinct component. In particular, the illustrated example shows a wire rope motion isolator.

Figure 5:
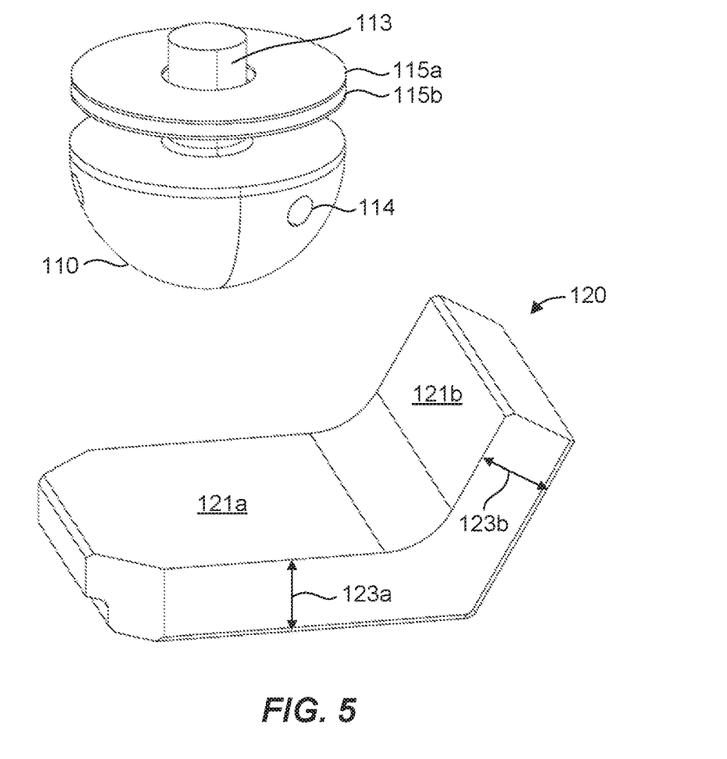
FIG. 5 is an illustration of a contact protrusion and an energy damping pad of the energy damping and displacement control device of FIGS. 2 and 3.

As illustrated in FIGS. 2-4, the energy damping and displacement control device 101 can include a contact protrusion 110 and an energy damping pad 120. The contact protrusion 110 and the energy damping pad 120 are shown isolated from other structures of the energy damping and displacement control device 101 in FIG. 5. The contact protrusion 110 can be operable to be associated with a base or a supported structure (e.g., the base 102 or the supported structure 103 in FIG. 1). The energy damping pad 120 can be operable to be associated with a base or a supported structure (e.g., the base 102 or the supported structure 103 in FIG. 1). Thus, for example, the contact protrusion 110 can be associated with the base 102 and the energy damping pad 120 can be associated with the supported structure 103. On the other hand, in another example, the contact protrusion 110 can be associated with the supported structure 103 and the energy damping pad 120 can be associated with the base 102.

In some cases, dynamic loading on the supported structure 103 may be such that it would cause the motion isolator 104, in the absence of the energy damping and displacement control device 101, to exceed its designed range of motion (e.g., stretching, twisting, and/or compressing beyond its elastic limits), which could damage the motion isolator 104 and/or cause an impact that could damage the supported structure 103. To prevent such negative consequences, the contact protrusion 110 can contact the energy damping pad 120 to limit motion and absorb energy, thereby protecting the motion isolator 104 as well as the supported structure 103 from damage.

In one aspect, the energy damping pad 120 can have a first face 121a and a second face 121b. In a static condition, the first and second faces 121a, 121b of the energy damping pad 120 can be separated from the contact protrusion 110. In a dynamic condition (e.g., under dynamic loading), displacement motion of the contact protrusion 110 relative to the energy damping pad 120 can be limited by contact with at least one of the first or second faces 121a, 121b of the energy damping pad 120, which provides motion displacement control of the contact protrusion 110 in multiple axes. As described in more detail below, contact of the contact protrusion 110 and the energy damping pad 120 can also provide energy damping in multiple axes.

The energy damping pad 120 can be constructed of any suitable resilient material, such as an elastomeric material. Any suitable elastomeric material can be utilized, such as natural elastomeric materials (e.g., natural rubber) and/or synthetic elastomeric materials (e.g., butyl rubber). In one aspect, a thickness 123a, 123b (FIG. 5) and/or modulus of the energy damping pad 120 can be configured, such that the energy damping pad 120 is operable to absorb excess energy resulting from combined loading scenarios and decelerate motion while controlling overall system displacements. In one aspect, the thicknesses 123a, 123b of the energy damping pad 120 associated with the respective faces 121a, 121b may be the same or different, which may depend on the impact scenarios that each face 121a, 121b is designed to experience. In another aspect, the size of the energy damping pad 120 (e.g., the surface area of the faces 121a, 121b) can be configured to ensure that the contact protrusion 110 properly contacts the energy damping pad 120 in any loading scenario.

The contact protrusion 110 can have any suitable configuration. In one example, the contact protrusion 110 can have a spherical configuration. A spherical contact protrusion 110 can impact or contact the energy damping pad 120 correctly regardless of the direction or orientation of contact protrusion 110 relative to the damping pad 120. In other words, a spherical configuration can provide a spherical contact interface with the energy damping pad 120 at any impact location or angle of impact with the energy damping pad 120 and at any orientation of the contact protrusion 110 at the point of contact with the energy damping pad 120. This can ensure that the energy absorbed by the energy damping pad 120 is consistent and predictable, as opposed to the variability of another contact configuration (e.g., a corner) contacting the energy damping pad 120. Thus, a spherical contact interface can provide a predictable and consistent distribution of energy to the energy damping pad 120 to enable the energy damping pad 120 to successfully absorb energy (e.g., in excess of that absorbed by the motion isolator 104) and dampen motion (e.g., decelerate the supported structure 103) in any loading condition.

Any suitable spherical configuration can be utilized, such as a whole or a part of a sphere. In the illustrated example, the contact protrusion 110 has a hemispherical configuration. The contact protrusion 110 can have any suitable size (e.g., a radius 111 shown in FIG. 4), which may be adjusted along with the thickness 123a, 123b of the energy damping pad 120 to achieve a desired energy dissipation level and pad longevity. For example, a larger radius 111 and a thicker energy damping pad 120 can dampen more energy. Thus, for a given amount of energy dissipation, the radius 111 of the contact protrusion 110 can be sized inversely proportional to the thickness 123a, 123b of the energy damping pad 120. In other words, a relatively thin energy damping pad 120 can be paired with a relatively large spherical contact protrusion 110, and a relatively thick energy damping pad 120 can be paired with a relatively small spherical contact protrusion 110. In one aspect, the radius 111 of the contact protrusion 110 can be selected based on the material of the energy damping pad 120 to ensure that the energy damping pad 120 is not damaged by the contact protrusion 110. For example, a relatively small contact protrusion 110 may cause excessive stress when impacting the energy damping pad 120, which exceeds the material strength. Thus, a larger radius 111 can result in reduced stress that will not damage the energy damping pad 120. In some examples, the size of the contact protrusion 110 and/or the energy damping pad 120 may be based on space constraints.

As illustrated in FIG. 4, the first face 121a can be oriented along a first plane 122a and toward the contact protrusion 110. The second face 121b can be oriented along a second plane 122b transverse to the first plane 122a at an angle 124 and toward the contact protrusion 110. The planes 122a, 122b can be at any suitable angle 124 relative to one another. The angle 124 may be varied to control rotation (e.g., roll, pitch, and/or yaw) and/or lateral displacement (e.g., surge and/or sway) of the supported structure 103. In one aspect, the angle 124 can be selected based on a characteristic of the motion isolator 104 (e.g., torsional stiffness of a wire rope motion isolator). For example, a relatively steep angle 124 can be utilized with a "soft" wire rope motion isolator, and a relatively low angle 124 can be utilized with a "firm" wire rope motion isolator. In another aspect, the angle 124 may depend on the weight distribution and motion of the supported structure 103 as supported by the motion isolators 104a-c. A typical angle 124 may be from about 20 degrees to about 90 degrees. The first face 121a can limit and dampen vertical (e.g., heave) displacement. In one aspect, the first plane 122a can be horizontal, although this need not always be the case and may be at an angle relative to a horizontal plane.

Figure 7:
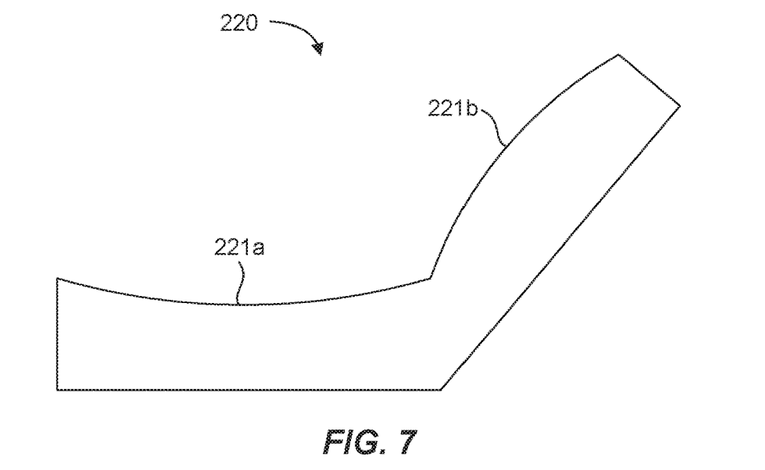
FIG. 7 is an illustration of an energy damping pad in accordance with an example of the present disclosure.

The first and second faces 121a, 121b of the energy damping pad 120 can have any suitable configuration. For example, at least one of the first or second faces 121a, 121b of the energy damping pad 120 can have a planar configuration, as shown in the illustrated example. In other examples, one or more faces of an energy damping pad can have a curved configuration. For instance, first and second faces 221a, 221b of an energy damping pad 220, as shown in FIG. 7, can each have a curved configuration. A curved face configuration can include any curved surface or portion of a surface on a face of a damping pad. Such faces can be curved in one direction or dimension or in multiple directions or dimensions (e.g., doubly curved). A curved configuration can also include linear or non-curved elements, such as a planar surface or a linear surface.

Figure 8:
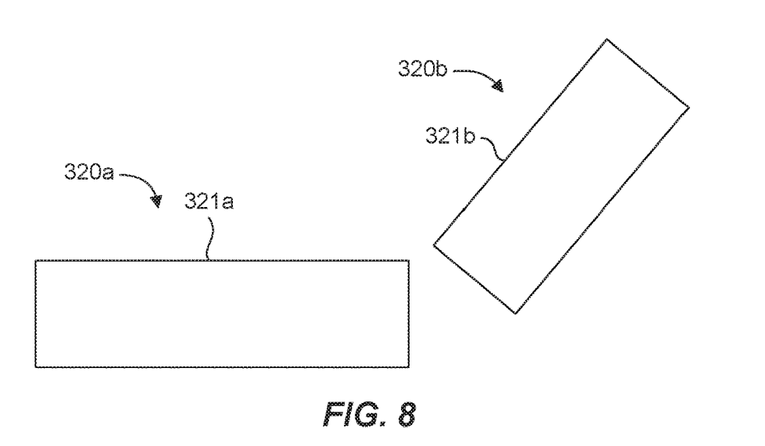
FIG. 8 is an illustration of an energy damping pad in accordance with an example of the present disclosure.

In one aspect, faces of an energy damping pad can be part of a single pad or multiple pads or pad portions (e.g., one individual pad or pad portion for each face). In the example illustrated in FIGS. 2-5, the first and second faces 121a, 121b are part of a single energy damping pad 120. In another example, shown in FIG. 8, first and second faces 321a, 321b are part of multiple, individual, separate, and distinct energy damping pads or pad portions 320a, 320b, respectively. In other words, the energy damping pad portion 320a can include the first face 321a and the energy damping pad portion 320b can include the second face 321b.

Figure 9:
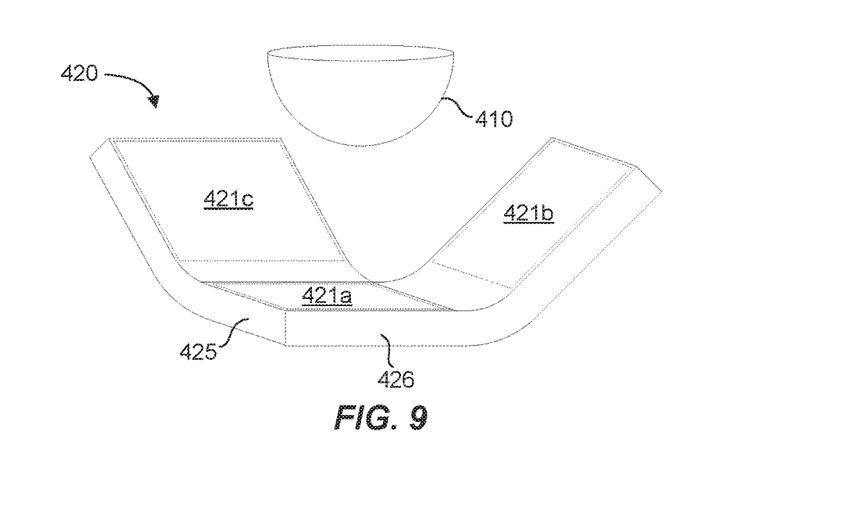
FIG. 9 is an illustration of an energy damping pad in accordance with an example of the present disclosure.

Although the example illustrated in FIGS. 2-5 has an energy damping pad 120 with two faces 121a, 121b, it should be recognized that an energy damping pad can have any number of faces oriented in any number of different orientations relative to one another. For example, an energy damping pad (or a combination of individual energy damping pads or pad portions) can have more than two faces. For example, as shown in FIG. 9, an energy damping pad 420 can have three faces 421a, 421b, 421c. An energy damping pad with three or more faces can have any suitable configuration. In this example, the face 421a is a horizontal face, and the faces 421b, 421c are vertically angled faces. Although the vertically angled faces 421b, 421c are not in direct contact, in some examples, multiple vertically angled faces can be in direct contact with one another. Although only three faces 421a-c are illustrated, the energy damping pad 420 can include additional faces. For example, the energy damping pad 420 can include a portion extending from 425 with a face opposite the face 421b and/or a portion extending from 426 with a face opposite the face 421c. Such an energy damping pad configuration can form pentagonal surfaces that can surround a contact protrusion 410 for bidirectional displacement limitation in multiple degrees of freedom. Angles between the various faces (or planes) of the energy damping pad 420 can be the same or different from one another for a given application based on the complexity of the motion, the supported weight, the impact direction and orientation of the faces.

Figure 10:
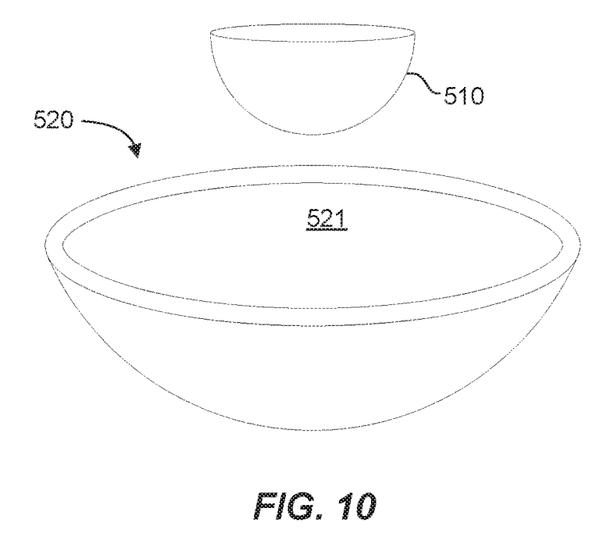
FIG. 10 is an illustration of an energy damping pad in accordance with an example of the present disclosure.

In one aspect, illustrated in FIG. 10, an energy damping pad 520 can have a continuous spherical face 521, which can form a spherical, 360 degree enclosed surface about a contact protrusion 510 for bidirectional displacement limitation in multiple degrees of freedom. Any suitable spherical configuration can be utilized, such as a whole or a part of a sphere. In the illustrated example, the spherical face 521 has a hemispherical configuration of less than half of a sphere, although other spherical configurations are contemplated. The energy damping pad 520 can have any suitable size (e.g., radius) and thickness in accordance with the principles described above.

Figure 6:
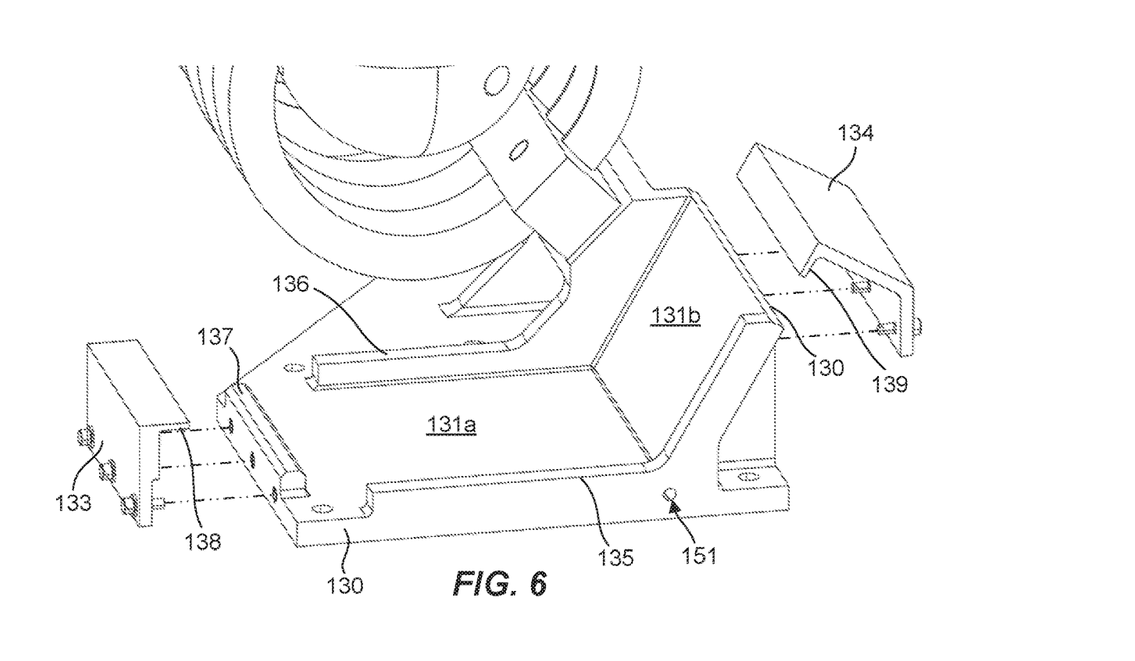
FIG. 6 is a detailed exploded view of the energy damping and displacement control device of FIGS. 2 and 3 with the energy damping pad omitted to show certain features of the device.

With further reference to FIGS. 2-6, the energy damping and displacement control device 101 can include a backing plate 130 in support of the energy damping pad 120. As shown in FIG. 6, the backing plate 130 can have a first support surface 131a and a second support surface 131b. In one aspect, the first and second support surfaces 131a, 131b of the backing plate 130 can be configured to support the respective first and second faces 121a, 121b of the energy damping pad 120 at the desired angle 124. The first and second support surfaces 131a. 131b of the backing plate 130 can have any suitable configuration. In one example, at least one of the first or second support surfaces 131a, 131b can have a planar configuration.

The energy damping and displacement control device 101 can also include a contact protrusion mounting bracket 140 coupled to, and in support of, the contact protrusion 110. The contact protrusion 110 can be mounted position and/or orientation relative to the energy damping pad 120, the supported load 103, and the base 102, such as on a top, a bottom, or a side of the supported structure, to provide any desired impact load direction. In one aspect, a vertical distance 112 (FIG. 4) between the contact protrusion 110 and the energy damping pad 120 in the static condition can be adjustable. The vertical distance 112 can control displacement of the contact protrusion 110 before contact with the energy damping pad 120 (and deceleration of the supported structure 103) to ensure that the energy damping pad 120 is properly absorbing energy to protect the system 100. For example, the vertical distance 112 can be adjusted to ensure that the contact protrusion 110 does not contact the energy damping pad 120 "too soon" (e.g., "bottoming out" on the energy damping pad 120) or "too late" (e.g., after failure of, or damage to, the motion isolator 104). Proper adjustment of the vertical distance 112 can therefore ensure that the energy damping pad 120 is absorbing or damping the right amount of energy and displacement during operation to maintain system integrity. Adjustment of the vertical distance 112 can be made based on data obtained from an accelerometer on the supported structure 103, thus fine tuning the as-built system 100.

The vertical distance 112 can be adjusted by any suitable device or mechanism. In one example, the contact protrusion 110 can be fixedly coupled to a threaded rod 113 (FIG. 5), which can be configured to engage a threaded hole 141 (FIGS. 2 and 3) in the contact protrusion mounting bracket 140. The contact protrusion 110 can include engagement openings 114 configured to receive an adjustment tool (not shown). Rotation of the contact protrusion 110 via the engagement openings 114 can cause the contact protrusion 110 to move up/down relative to the energy damping pad 120 via the threaded engagement of the threaded rod 113 and the threaded hole 141. In one aspect, the vertical distance 112 can be adjustable with one or more shims 115a, 115b between the contact protrusion 110 and the contact protrusion mounting bracket 140. The shims 115a, 115b can be added or removed as needed to achieve a desired vertical distance 112. The shims 115a, 115b can have any suitable thickness, which can be the same or different among the various shims utilized.

In one aspect, the energy damping and displacement control device 101 can include retainer brackets or walls 133-137 attached to the backing plate 130. The retainer brackets 133-137 can be configured to contact sides of the energy damping pad 120 to minimize shear force in the energy damping pad 120 during contact with the contact protrusion 110 to maintain the energy damping pad 120 intact during high impact. The peripheral support provided by the retainer brackets 133-137 can limit shear motion of the energy damping pad 120 (e.g., under high impact load) relative to the underlying first and second support surfaces 131a, 131b of the backing plate 130 and keep the energy damping pad 120 intact and in place. The energy damping pad 120 may dimensionally expand (e.g., laterally) under impact with the contact protrusion 110. Such expansion may facilitate proper energy dissipation by the energy damping pad 120. Thus, in one aspect, the retainer brackets 133-137 can spaced from the energy damping pad 120, such as by a gap at 150 (FIG. 2), to accommodate dimensional expansion of the energy damping pad 120 under impact sufficient to dissipate energy from the impact while also limiting shear motion of the energy damping pad 120 relative to the underlying first and second support surfaces 131a, 131b of the backing plate 130. In other words, the retainer brackets 133-137 can be configured to limit shear motion of the energy damping pad 120, while also providing adequate room for the energy damping pad 120 to expand under impact in order to adequately dissipate energy from the impact. Thus, the gap 150 can be sized to allow proper damper material expansion due to impact by the contact protrusion 110, which can enhance damping stability. In one aspect, one or more of the retainer brackets 133-137 can provide a water drainage and/or air escape path 151 around and/or under the energy damping pad 120. Such a drainage or escape path 151 can provide additional energy absorption and damping stability.

The retainer brackets 133-137 can be positioned in any suitable location, such as on one or more lateral sides of the energy damping pad 120. For example, as shown in FIG. 6, the retainer brackets 133-137 are positioned to surround all lateral sides of the energy damping pad 120, although it should be recognized that retainer brackets may be located on fewer than all lateral sides of an energy damping pad. In one aspect, one or more of the retainer brackets 133-137 can be configured to cover (e.g., be located over) a portion of one or more top surfaces (e.g., the faces 121a, 121b) of the energy damping pad 120 to provide a physical or mechanical barrier to removal of the energy damping pad 120 from the backing plate 130. For example, the retainer brackets 133, 134 can include respective flanges 138, 139. The flanges 138, 139 can be configured to cover portions of the respective faces 121a, 121b of the energy damping pad 120 to capture the energy damping pad 120 on the backing plate 130. In one aspect, the retainer brackets 133-137 can each provide a physical or mechanical barrier to displacement or removal of the energy damping pad 120 from the backing plate 130, and can therefore function together to maintain the energy damping pad in place on the backing plate 130. In one aspect, the energy damping pad 120 can be glued or bonded to the underlying backing plate 130. Such gluing or bonding can be employed with or without the retainer brackets 133-137. In one aspect, the retainer brackets 133-137 can provide support for the energy damping pad 120 sufficient to prevent bonding failure during use.

In one aspect, the backing plate 130 can be operable to mount the energy damping pad 120 to a structure (e.g., the base 102 or the supported structure 103). Similarly, the contact protrusion mounting bracket 140 can be operable to mount the contact protrusion 110 to a structure (e.g., the base 102 or the supported structure 103). In one aspect, the motion isolator 104 can be combined or included as a part of the energy damping and displacement control device 101. In the illustrated example, the wire rope motion isolator 104 includes mounting brackets 105a, 105b for respective coil supports 106a, 106b of the wire rope motion isolator. In one aspect, the mounting bracket 105a can be coupled to or be formed integral with the backing plate 130, and the mounting bracket 105b can be coupled to or be formed integral with the contact protrusion mounting bracket 140. The backing plate 130 (and the mounting bracket 105a) and the contact protrusion mounting bracket 140 (and the mounting bracket 105b) can be secured to a structure (e.g., the base 102 or the supported structure 103) in any suitable manner, such as by utilizing fasteners in holes or openings 152 (FIG. 2).

It should be recognized that one or more energy damping and displacement control devices 101a-c can be utilized in any quantity, at any location, and arranged in any configuration about the supported structure 103 in order to adequately support and protect the supported structure 103. Typically, an energy damping and displacement control device 101 will be positioned at a location of highest displacement, such as a corner. Although the illustrated examples show the energy damping and displacement control devices 101a-c located on a bottom side of the supported structure 103, it should be recognized that an energy damping and displacement control device can be located on any suitable side or surface of a supported structure (e.g., side walls, top corners, etc.) based on weight distribution and the center of gravity and/or used to provide damping and displacement control for multiple supported structures at once (e.g., in a link chain arrangement).

Figure 11:
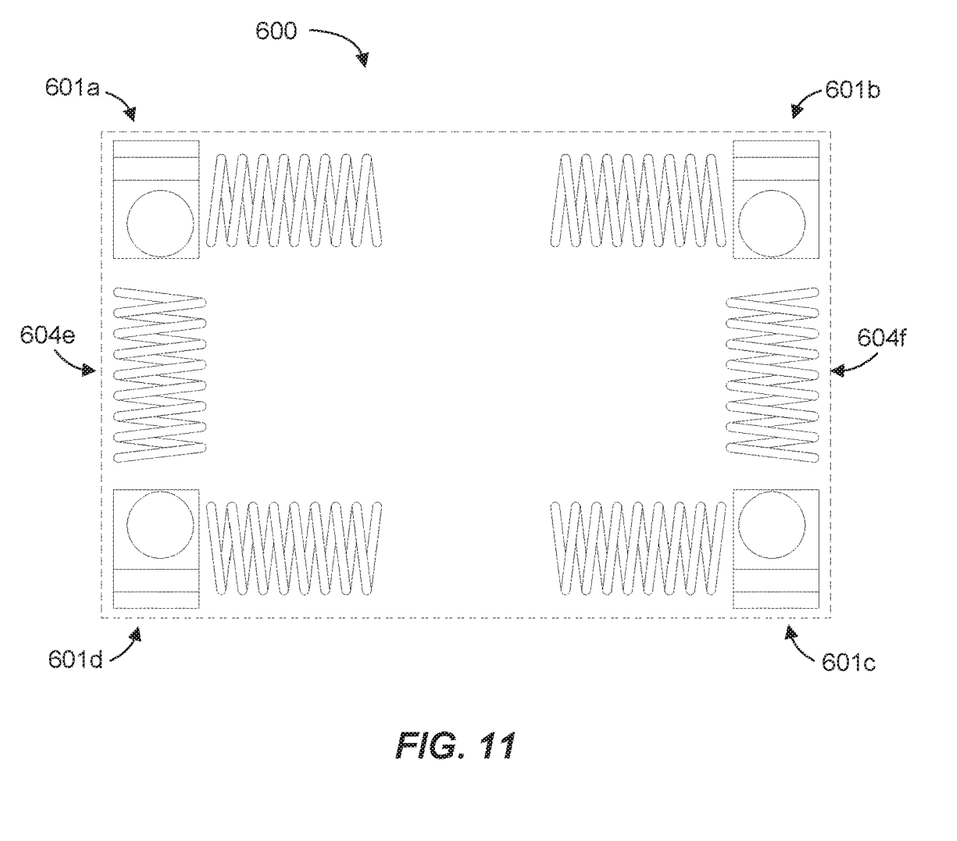
FIG. 11 is an illustration of an energy damping and displacement control system in accordance with an example of the present disclosure.

In one aspect, illustrated in FIG. 11, an energy damping and displacement control system 600 can include one or more energy damping and displacement control devices 601a-d and one or more motion isolators 604e, 604f that are independent of the energy damping and displacement control devices 601a-d. Thus, an energy damping and displacement control device and a motion isolator can be integral or independent of one another and utilized together in a system in any quantity, at any location, and arranged in any configuration to achieve desired system motion control performance.

In accordance with one embodiment of the present invention, a method for facilitating energy damping and displacement control is disclosed. The method can comprise obtaining an energy damping and displacement control device comprising a contact protrusion, and an energy damping pad constructed of a resilient material, the energy damping pad having a first face oriented along a first plane, and a second face oriented along a second plane transverse to the first plane. The method can further comprise facilitating coupling of the contact protrusion to at least one of a base or a supported structure. Additionally, the method can comprise facilitating coupling of the energy damping pad to at least one of the base or the supported structure, wherein the first face and the second face are oriented toward the contact protrusion, wherein, in a static condition, the first and second faces of the energy damping pad are separated from the contact protrusion, and, in a dynamic condition, displacement motion of the contact protrusion relative to the energy damping pad is limited by contact with at least one of the first or second faces of the energy damping pad, which provides energy damping and motion displacement control of the contact protrusion in multiple axes. It is noted that no specific order is required in this method, though generally in one embodiment, these method steps can be carried out sequentially.

In one aspect of the method, facilitating coupling of the contact protrusion to at least one of the base or the supported structure can comprise obtaining a contact protrusion mounting bracket operable to mount the contact protrusion to at least one of the base or the supported structure, and coupling the contact protrusion mounting bracket to the contact protrusion.

In one aspect of the method, facilitating coupling of the energy damping pad to at least one of the base or the supported structure can comprise obtaining a backing plate operable to mount the energy damping pad to at least one of the base or the supported structure, wherein the backing plate is configured to support of the energy damping pad, the backing plate having a first support surface and a second support surface operable to support the respective first and second faces of the energy damping pad, and coupling the backing plate to the energy damping pad.

In one aspect, coupling the backing plate to the energy damping pad can comprise obtaining a plurality of retainer brackets and attaching the retainer brackets to the backing plate, the retainer brackets can be configured to contact sides of the energy damping pad to minimize shear force in the energy damping pad during contact with the contact protrusion to maintain the energy damping pad intact during high impact.

In one aspect, the method can further comprise obtaining a motion isolator.

In another aspect, the method can further comprise facilitating adjustment of a vertical distance between the contact protrusion and the energy damping pad in the static condition. In one aspect, facilitating adjustment of the vertical distance can comprise obtaining a shim.

Reference was made to the examples illustrated in the drawings and specific language was used herein to describe the same. It will nevertheless be understood that no limitation of the scope of the technology is thereby intended. Alterations and further modifications of the features illustrated herein and additional applications of the examples as illustrated herein are to be considered within the scope of the description.

Although the disclosure may not expressly disclose that some embodiments or features described herein may be combined with other embodiments or features described herein, this disclosure should be read to describe any such combinations that would be practicable by one of ordinary skill in the art. The user of "or" in this disclosure should be understood to mean non-exclusive or, i.e., "and/or," unless otherwise indicated herein.

Furthermore, the described features, structures, or characteristics may be combined in any suitable manner in one or more examples. In the preceding description, numerous specific details were provided, such as examples of various configurations to provide a thorough understanding of examples of the described technology. It will be recognized, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. An energy damping and displacement control device, comprising:
   a contact protrusion having a spherical surface configuration; and
   an energy damping pad constructed of a resilient material, the energy damping pad having a first face oriented along a first plane, and a second face oriented along a second plane transverse to the first plane, and toward the contact protrusion,
   wherein, in a static condition, the first and second faces of the energy damping pad are separated from the contact protrusion, and, in a dynamic condition, displacement motion of the contact protrusion relative to the energy damping pad is limited by a spherical contact interface between the contact protrusion and at least one of the first or second faces of the energy damping pad at any impact location, at any angle of impact, and at any orientation of the contact protrusion at a point of contact with the energy damping pad, which provides energy damping and motion displacement control of the contact protrusion in multiple axes.

2. The energy damping and displacement control device of claim 1, further comprising a motion isolator.

3. The energy damping and displacement control device of claim 2, wherein the motion isolator comprises a wire rope motion isolator.

4. The energy damping and displacement control device of claim 1, wherein the energy damping pad comprises a first energy damping pad portion and a second energy damping pad portion separate and distinct from the first energy damping pad portion, the first energy damping pad portion including the first face and the second energy damping pad portion including the second face.

5. The energy damping and displacement control device of claim 1, further comprising a contact protrusion mounting bracket coupled to the contact protrusion and operable to mount the contact protrusion to a structure.

6. The energy damping and displacement control device of claim 1, wherein at least one of the first or second faces of the energy damping pad has a planar configuration.

7. The energy damping and displacement control device of claim 1, wherein at least one of the first or second faces of the energy damping pad has a curved configuration.

8. The energy damping and displacement control device of claim 1, further comprising a backing plate in support of the energy damping pad, the backing plate having a first support surface and a second support surface in support of the respective first and second faces of the energy damping pad.

9. The energy damping and displacement control device of claim 8, wherein at least one of the first or second support surfaces of the backing plate has a planar configuration.

10. The energy damping and displacement control device of claim 8, wherein the backing plate is operable to mount the energy damping pad to a structure.

11. The energy damping and displacement control device of claim 8, further comprising a plurality of retainer brackets attached to the backing plate, the retainer brackets being configured to contact sides of the energy damping pad to minimize shear force in the energy damping pad during contact with the contact protrusion to maintain the energy damping pad intact during high impact.

12. The energy damping and displacement control device of claim 1, wherein a vertical distance between the contact protrusion and the energy damping pad in the static condition is adjustable.

13. The energy damping and displacement control device of claim 12, wherein the vertical distance is adjustable with a shim.

14. An energy damping and displacement control system, comprising:
   a base;
   a supported structure;
   a motion isolator supporting the supported structure about the base; and
   an energy damping and displacement control device comprising
      a contact protrusion associated with one of the base or the supported structure, the contact protrusion having a spherical surface configuration, and
      an energy damping pad associated with the other of base or the supported structure, the damping pad being constructed of a resilient material and having a first face oriented along a first plane, and a second face oriented along a second plane transverse to the first plane, and toward the contact protrusion,
      wherein, in a static condition, the first and second faces of the energy damping pad are separated from the contact protrusion, and, in a dynamic condition, displacement motion of the contact protrusion relative to the energy damping pad is limited by a spherical contact interface between the contact protrusion and at least one of the first or second faces of the energy damping pad at any impact location, at any angle of impact, and at any orientation of the contact protrusion at a point of contact with the energy damping pad, which provides energy damping and motion displacement control of the contact protrusion in multiple axes.

15. The system of claim 14, wherein the base comprises a deck of a ship and the supported structure comprises an electronics enclosure.

16. The system of claim 14, wherein the motion isolator comprises a wire rope motion isolator.

17. The system of claim 14, wherein the energy damping and displacement control device includes the motion isolator.

18. The system of claim 14, wherein the energy damping and displacement control device comprises a plurality of energy damping and displacement control devices.

19. The system of claim 18, further comprising a second motion isolator independent of the plurality of energy damping and displacement control devices.

20. A method for facilitating energy damping and displacement control, comprising:

obtaining an energy damping and displacement control device comprising:
  a contact protrusion having a spherical surface configuration, and
  an energy damping pad constructed of a resilient material, the energy damping pad having a first face oriented along a first plane, and a second face oriented along a second plane transverse to the first plane;
facilitating coupling of the contact protrusion to at least one of a base or a supported structure; and
facilitating coupling of the energy damping pad to at least one of the base or the supported structure, wherein the first face and the second face are oriented toward the contact protrusion,
wherein, in a static condition, the first and second faces of the energy damping pad are separated from the contact protrusion, and, in a dynamic condition, displacement motion of the contact protrusion relative to the energy damping pad is limited by a spherical contact interface between the contact protrusion and at least one of the first or second faces of the energy damping pad at any impact location, at any angle of impact, and at any orientation of the contact protrusion at a point of contact with the energy damping pad, which provides energy damping and motion displacement control of the contact protrusion in multiple axes.

21. The method of claim 20, wherein facilitating coupling of the contact protrusion to at least one of the base or the supported structure comprises:
  obtaining a contact protrusion mounting bracket operable to mount the contact protrusion to at least one of the base or the supported structure; and
  coupling the contact protrusion mounting bracket to the contact protrusion.

22. The method of claim 20, wherein facilitating coupling of the energy damping pad to at least one of the base or the supported structure comprises
  obtaining a backing plate operable to mount the energy damping pad to at least one of the base or the supported structure, wherein the backing plate is configured to support of the energy damping pad, the backing plate having a first support surface and a second support surface operable to support the respective first and second faces of the energy damping pad; and
  coupling the backing plate to the energy damping pad.

23. The method of claim 22, wherein coupling the backing plate to the energy damping pad comprises obtaining a plurality of retainer brackets and attaching the retainer brackets to the backing plate, the retainer brackets being configured to contact sides of the energy damping pad to minimize shear force in the energy damping pad during contact with the contact protrusion to maintain the energy damping pad intact during high impact.

24. The method of claim 20, further comprising obtaining a motion isolator.

25. The method of claim 20, further comprising facilitating adjustment of a vertical distance between the contact protrusion and the energy damping pad in the static condition.

26. The method of claim 25, wherein facilitating adjustment of the vertical distance comprises obtaining a shim.

* * * * *